United States Patent
Kennedy

[15] 3,679,887
[45] July 25, 1972

[54] LIGHT REFLECTION PREVENTIVE DEVICE

[72] Inventor: Peter J. Kennedy, Rochester, England
[73] Assignee: Ford Motor Company, Dearborn, Mich.
[22] Filed: June 25, 1971
[21] Appl. No.: 156,781

[30] Foreign Application Priority Data

Oct. 14, 1970 Great Britain...................48,743/70

[52] U.S. Cl..............................240/8.16, 180/90
[51] Int. Cl............................................B60q 3/04
[58] Field of Search..................240/8.16; 180/90; 296/84 R, 296/97 E, 97 F

[56] References Cited

UNITED STATES PATENTS 1,557,388  10/1925  Tilden....................................296/97 F
3,053,337  9/1962  Prohaska et al....................240/8.16 X Primary Examiner—Donald O. Woodiel
Attorney—John R. Faulkner and John J. Roethel

[57] ABSTRACT

Reflection by the windshield of light, such as the light from an instrument mounted in a vehicle cowl structure or dash panel, into the eyes of the vehicle operator when viewing the road ahead is prevented by slats arranged between the operator and the lighted instrument. The plane of the slats are approximately aligned with the operators line of sight.

3 Claims, 2 Drawing Figures

PATENTED JUL 25 1972   BEST AVAILABLE COPY   3,679,887

INVENTOR
Peter J. Kennedy
BY
John R. Faulkner
John J. Roethel
ATTORNEYS

LIGHT REFLECTION PREVENTIVE DEVICE

Light from the instruments in the cowl structure or dash panel of a motor vehicle is in modern vehicles with inclined windshields reflected by the windshield toward the driver or vehicle operator. In conventional practice, several things have been done to prevent such reflection of instrument light into the operator's eyes. This has been accomplished, for example, by a rearward extension of the upper lip of the instrument panel, or by setting the instrument at the base of a very deep cylinder, or by selecting the angle that the faces of the instrument make with vertical, or by a combination of any of these methods.

All of these methods set limitations on the freedom of choice of the vehicle stylists and may dictate the relative positions of certain vehicle parts within the passenger compartment. For example, the steering wheel of an axially collapsible safety steering column is required to be a certain distance from the instrument or dash panel. If the dash panel has a rearward extension, then the wheel must be a certain distance from the extension. This in turn means that the wheel has to be located further from the dash panel than would be the case if the rearward extension necessary to prevent reflection by the windshield were omitted.

It is an object of the present invention to avoid such limitations and to provide an effective device for preventing reflection of light from the windshield into the vehicle operator's eyes.

SUMMARY OF THE INVENTION

The present invention relates to a motor vehicle having a dash panel or cowl structure, a windshield rearwardly upwardly inclined from the cowl structure and an instrument panel mounted in the cowl structure. The instrument panel is fitted with vehicle performance indicating instruments visible to the operator. he viewing faces of the instruments are upwardly inclined with projections of the planes of the viewing faces intersecting the windshield. Light means are provided for illuminating at least some of the instruments. The improvement embodied in the present invention comprises a plurality of slats positioned across the viewing faces of the instruments. The plane of the slats are substantially aligned with the vehicle operators line of sight. The slats are positioned to prevent reflection of light from the lighted instruments upward to the windshield and then into the vehicle operator's eyes. As a further improvement, the slats may be adjustably supported for pivotal movement, the slats being adjustable for movement of the major planes thereof toward or away from the operator's line of sight.

DESCRIPTION OF THE DRAWING

Further features and advantages of the present invention will be explained in greater detail making reference to the description which now follows, reference being had to the drawing in which.

DETAILED DESCRIPTION OF THE INVENTION

Figure 1:
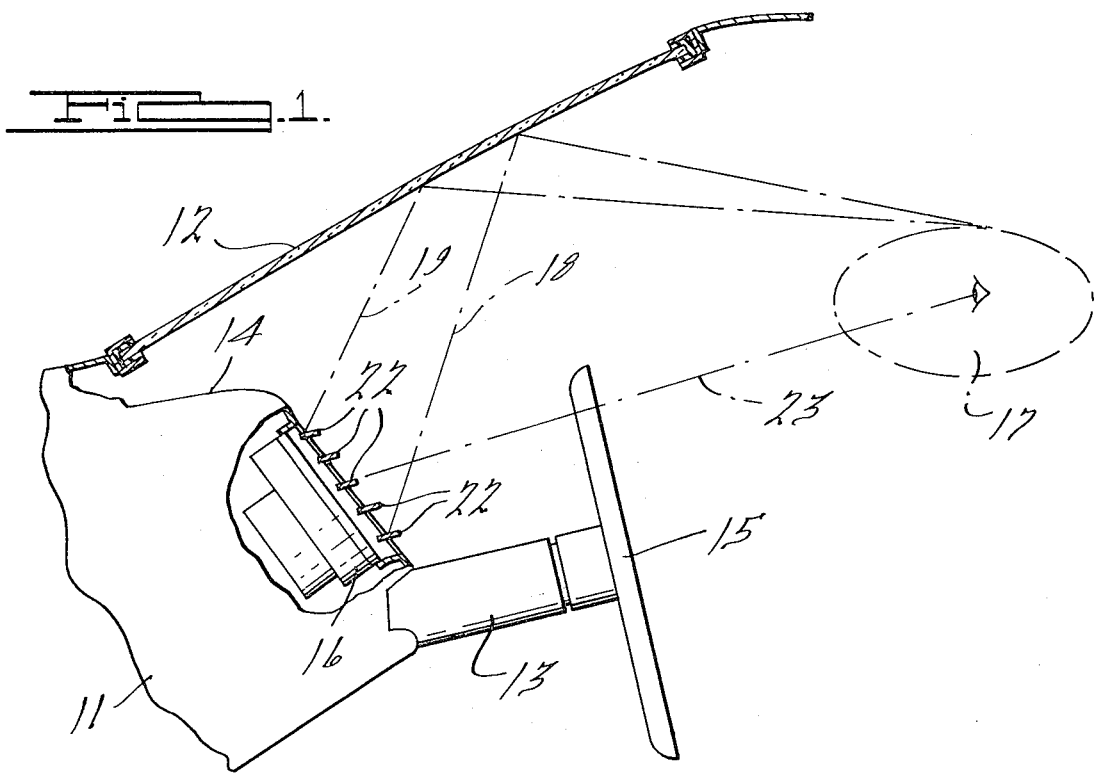
FIG. 1 is a diagrammatic longitudinal section through an upper part of a motor vehicle.
Figure 2:
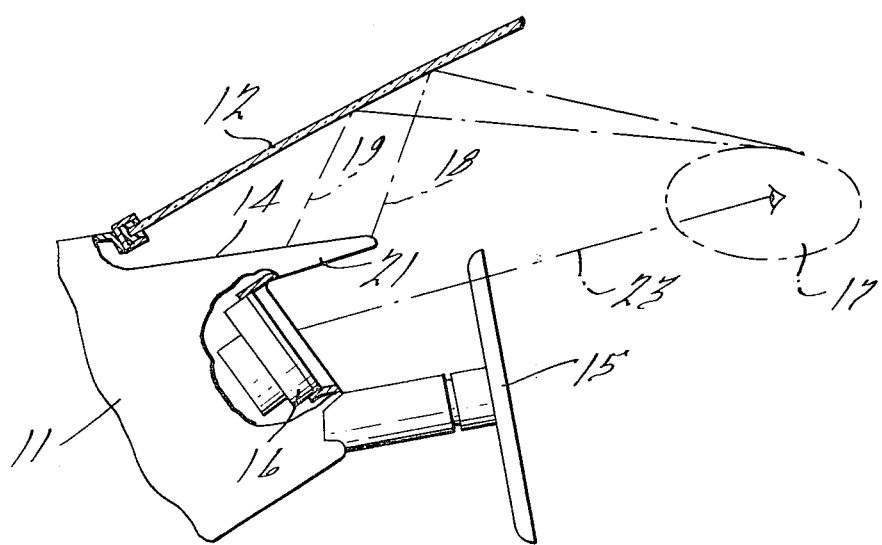
FIG. 2 is a view in art similar to FIG. 1 illustrating the prior art solution to the problem of inhibiting instrument light reflection.

FIG. 1 of the drawing illustrates part of the passenger compartment of a vehicle having a dash panel or cowl structure 11, a windshield 12 and a steering column 13. The dash panel or cowl structure 11, as is conventional, is covered with padding 14. he steering column 13 is usually collapsible in the event of the steering wheel 15 being subjected to a heavy impact. An instrument panel 16, which may include a speedometer, fuel and temperature gauges, revolution indicators and other instruments is mounted in the cowl structure 11. The instruments are illuminated for visibility at night by lights fitted in the panel.

The area within which the eyes of the driver of average size would be found is indicated by the area 17. A light ray 18 from the lower edge of the instrument panel and a light ray 19 from the upper edge of the instrument panel, in the absence of the arrangement of this invention, would be reflected by the windshield 12 into the eye of the driver when viewing the road ahead.

As shown in 2, which represents the prior art structures, reflection of light by the windshield is usually prevented by an extension 21 of the upper edge of the cowl structure or dash panel 11. Extension 21 causes packaging problems in the passenger compartment and may interfere with the collapse of the wheel 15 in the event of an accident.

The present invention enables the extension 21 to be omitted. To prevent the reflection of light from the panel by the windshield 12, slats 22 are arranged between the driver and each instrument in the panel. The planes of the slats 22 are approximately aligned with the driver's line of sight 23 direct to the panel 11.

It is also preferable for the slats 22 to be adjustable in such a manner that the major planes of the slats are movable relative to the driver's line of sight 23. That is, the slats are mounted for pivotable movement about substantially horizontal axes. he slats function in effect as the slats in a venetian blind. As can be seen, the lower slat obstructs the light ray 18 while the upper slat obstructs the light ray 19, with the intermediate slats obstructing all light rays in between.

t will be understood that the invention is not to be limited to the exact construction shown and described, but that various changes and modifications may be made without departing from the spirit and scope of the invention as defined in the appended claims.

What I claim is:

1. n a motor vehicle having a cowl structure,
a windshield rearwardly upwardly inclined from the cowl structure,
and an instrument panel mounted in the cowl structure having vehicle performance indicating instruments visible to the operator,
the viewing faces of the instruments being upwardly inclined with projections of the planes of the viewing faces intersecting the windshield,
light means illuminating at least some of the instruments,
wherein the improvement comprises:
a plurality of slats positioned across the viewing faces of the instruments,
the plane of the slats being substantially aligned with the vehicle operator's line of sight,
the slats being positioned to prevent reflection of light from lighted instruments upward to the windshield and then into the vehicle operator's eyes.

2. In a motor vehicle according to claim 1, in which:
adjustment means support the slats for pivotable movement about substantially parallel axes,
the slats being adjustable for movement of the major planes thereof relative to the operator's line of sight.

3. In a motor vehicle according to claim 2, in which:
the axes of the slats are substantially horizontal.

* * * * *